United States Patent
Nicholson et al.

(10) Patent No.: US 9,983,695 B2
(45) Date of Patent: May 29, 2018

(54) APPARATUS, METHOD, AND PROGRAM PRODUCT FOR SETTING A CURSOR POSITION

(71) Applicant: LENOVO (Singapore) PTE, LTD., New Tech Park (SG)

(72) Inventors: John Weldon Nicholson, Cary, NC (US); Russell Speight VanBlon, Raleigh, NC (US)

(73) Assignee: Lenovo (Singapore)PTE. LTD., New Tech Park (SG)

( * ) Notice: Subject to any disclaimer, the term of this patent is extended or adjusted under 35 U.S.C. 154(b) by 25 days.

(21) Appl. No.: 14/662,589

(22) Filed: Mar. 19, 2015

(65) Prior Publication Data
US 2016/0274683 A1    Sep. 22, 2016

(51) Int. Cl.
*G06F 3/0354* (2013.01)
*G06F 3/038* (2013.01)
*G06F 3/0346* (2013.01)

(52) U.S. Cl.
CPC ........ *G06F 3/03545* (2013.01); *G06F 3/0346* (2013.01); *G06F 3/0383* (2013.01)

(58) Field of Classification Search
CPC ...... G06F 3/033; G06F 3/0383; G06F 3/0416; G06F 3/04883; G06F 3/0346; G06F 3/03545
See application file for complete search history.

(56) References Cited

U.S. PATENT DOCUMENTS

| | | | |
|---|---|---|---|
| 5,821,916 A | 10/1998 | Watson et al. | |
| 7,728,825 B2 | 6/2010 | Kolmykov-Zotov et al. | |
| 9,218,071 B2* | 12/2015 | Westhues | G06F 3/03545 |
| 9,262,034 B2* | 2/2016 | Yao | G06F 3/046 |
| 9,389,701 B2* | 7/2016 | Bakken | G06F 3/033 |
| 2006/0214926 A1* | 9/2006 | Kolmykov-Zotov | G06F 3/04842 345/179 |
| 2008/0238887 A1 | 10/2008 | Love | |
| 2013/0088465 A1* | 4/2013 | Geller | G06F 3/03545 345/179 |
| 2014/0204059 A1* | 7/2014 | Geaghan | G06F 3/0416 345/174 |
| 2014/0209688 A1* | 7/2014 | Branca, Jr. | G06K 19/07737 235/492 |

FOREIGN PATENT DOCUMENTS

| | | |
|---|---|---|
| EP | 2711825 A2 | 3/2014 |
| WO | 2013183533 A1 | 12/2013 |
| WO | 2014181403 A1 | 11/2014 |

* cited by examiner

*Primary Examiner* — Abbas I Abdulselam
(74) *Attorney, Agent, or Firm* — Kunzler, PC

(57) ABSTRACT

Apparatuses, methods, and program products are disclosed for setting a cursor position. One method includes receiving, by use of a processor, indications of a first stylus position corresponding to a first time period. In some embodiments, the method includes receiving indications of a second stylus position corresponding to a second time period after the first time period. In a further embodiment, the method includes determining a cursor position as a function of the indications of the first stylus position, the indications of the second stylus position, and at least one other input.

17 Claims, 6 Drawing Sheets

APPARATUS, METHOD, AND PROGRAM PRODUCT FOR SETTING A CURSOR POSITION

FIELD

The subject matter disclosed herein relates to styluses and more particularly relates to setting a cursor position using a stylus.

BACKGROUND

Description of the Related Art

Information handling devices, such as desktop computers, laptop computers, tablet computers, smart phones, optical head-mounted display units, smart watches, etc., are ubiquitous in society. These information handling devices may use a stylus for receiving input. Using a stylus may facilitate precise input to be provided to the information handling device, among other benefits.

BRIEF SUMMARY

An apparatus for setting a cursor position is disclosed. A method and computer program product also perform the functions of the apparatus. In one embodiment, the apparatus includes an input-sensitive display that receives stylus input, a processor, and a memory that stores code executable by the processor. The code, in various embodiments, receives indications of a first stylus position corresponding to a first time period. In a further embodiment, the code receives indications of a second stylus position corresponding to a second time period after the first time period. The code may determine a cursor position as a function of the indications of the first stylus position, the indications of the second stylus position, and at least one other input.

In a further embodiment, the apparatus includes a stylus and the stylus includes a sensor selected from the group consisting of a motion sensor and a position sensor. In some embodiments, the apparatus includes a stylus and the stylus one or more of an accelerometer, a gyroscope, an altimeter, and a wireless transceiver. In such embodiments, the code that receives the indications of the first stylus position further includes code that receives the indications of the first stylus position from the sensor, and the code that receives the indications of the second stylus position further includes code that receives the indications of the second stylus position from the sensor.

In another embodiment, the code that determines the cursor position further includes code that sets the cursor position to a position corresponding to the indications of the first stylus position in response to a graphical feature being located on the input-sensitive display near the position. In a further embodiment, the code that determines the cursor position further includes code that sets the cursor position to a position corresponding to the indications of the first stylus position in response to a cursor graphic on the input-sensitive display changing during one or more of the first time period and the second time period.

In some embodiments, the code that determines the cursor position further includes code that sets the cursor position to a position corresponding to the indications of the first stylus position in response to the indications of the first and second stylus positions indicating that the stylus and the input-sensitive display are nearing each other. In certain embodiments, the at least one other input includes one or more of an input that sets the cursor position to a position corresponding to the indications of the first stylus position in response to a graphical feature being located on the input-sensitive display near the position, an input that sets the cursor position to the position corresponding to the indications of the first stylus position in response to a cursor graphic on the input-sensitive display changing during one or more of the first time period and the second time period, and an input that sets the cursor position to the position corresponding to the indications of the first stylus position in response to indications of the first and second stylus positions indicating that the stylus and the input-sensitive display are nearing each other.

A method for setting a cursor position, in one embodiment, includes receiving, by use of a processor, indications of a first stylus position corresponding to a first time period. In some embodiments, the method includes receiving indications of a second stylus position corresponding to a second time period after the first time period. In a further embodiment, the method includes determining a cursor position as a function of the indications of the first stylus position, the indications of the second stylus position, and at least one other input.

In some embodiments, receiving the indications of the first stylus position further includes receiving indications that a stylus is in a hovering position. In another embodiment, the method includes sensing the indications of the first and second stylus positions using a stylus. In some embodiments, sensing the indications of the first and second stylus positions further includes sensing the indications of the first and second stylus positions using a sensor in the stylus.

In some embodiments, the method includes sensing the first and second stylus positions using a display. In a further embodiment, sensing the first and second stylus positions using the display further includes determining a signal strength created by a position of a stylus relative to the display.

In certain embodiments, receiving indications of the first and second stylus positions further includes receiving indications of the first and second stylus positions relative to a display position. In such embodiments, receiving the indications of the first and second stylus positions relative to the display position further includes receiving indications that a stylus remains substantially stationary during changes in the display position.

In one embodiment, a program product includes a computer readable storage medium that stores code executable by a processor. The executable code, in certain embodiments, includes code to perform receiving indications of a first stylus position corresponding to a first time period. In a further embodiment, the executable code includes code to perform receiving indications of a second stylus position corresponding to a second time period after the first time period. The executable code, in some embodiments, includes code to perform determining a cursor position as a function of the indications of the first stylus position, the indications of the second stylus position, and at least one other input.

In certain embodiments, the code that performs determining the cursor position further includes code that performs setting the cursor position to a position corresponding to the indications of the first stylus position in response to a graphical feature being located on a display near the position. In some embodiments, the code that performs determining the cursor position further includes code that performs setting the cursor position to a position corresponding to the indications of the first stylus position in response to a cursor graphic on a display changing during one or more of the first time period and the second time period.

In further embodiments, the code that performs determining the cursor position further includes code that performs setting the cursor position to a position corresponding to the indications of the first stylus position in response to indications of the first and second stylus positions indicating that the stylus and a display are nearing each other.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
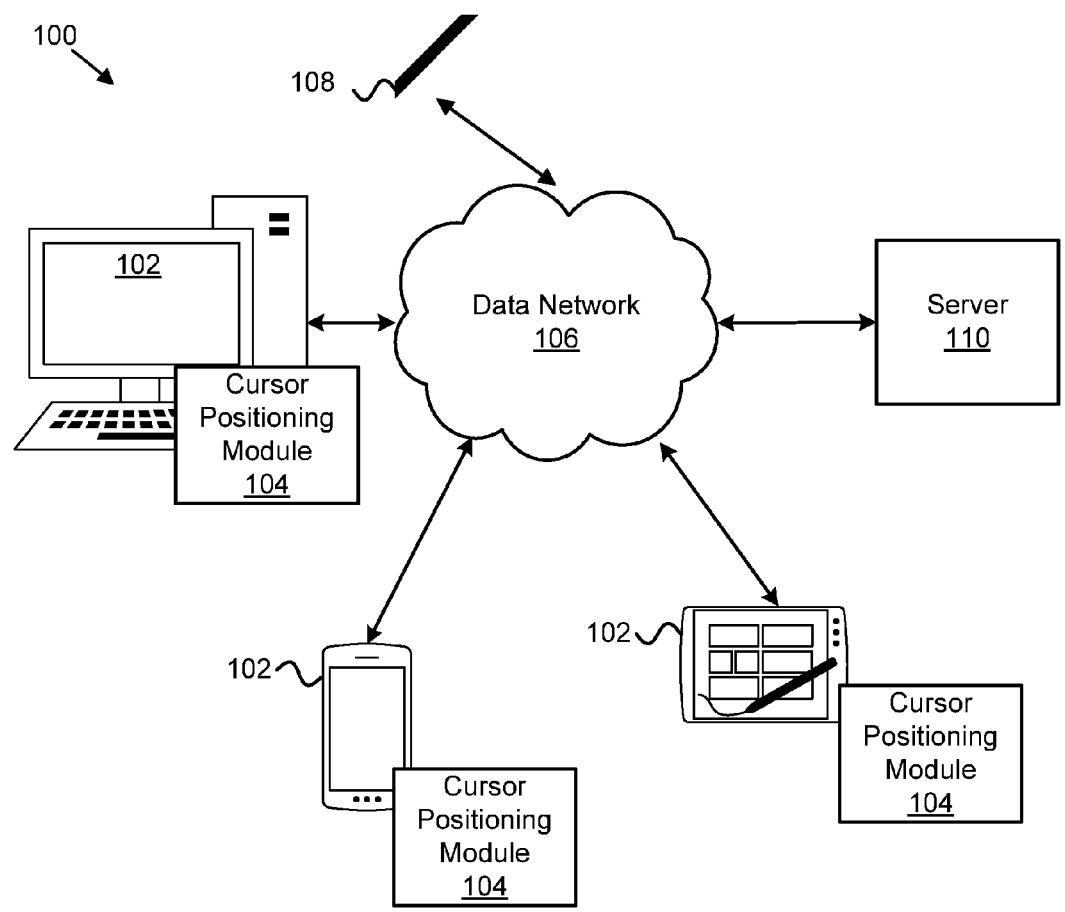
FIG. 1 is a schematic block diagram illustrating one embodiment of a system for setting a cursor position.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for positioning a cursor. In one embodiment, the system 100 includes information handling devices 102, cursor positioning modules 104, data networks 106, writing devices 108, and servers 110. Even though a specific number of information handling devices 102, cursor positioning modules 104, data networks 106, writing devices 108, and servers 110 are depicted in FIG. 1, one of skill in the art will recognize that any number of information handling devices 102, cursor positioning modules 104, data networks 106, writing devices 108, and servers 110 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, or the like. In some embodiments, the information handling devices 102 include wearable devices, such as smart watches, fitness bands, optical head-mounted displays, or the like.

The information handling devices 102 may include an embodiment of the cursor positioning module 104. In certain embodiments, the cursor positioning module 104 may receive indications of a first stylus position corresponding to a first time period. The cursor positioning module 104 may also receive indications of a second stylus position corresponding to a second time period after the first time period. The cursor positioning module 104 may determine a cursor position in response to the indications of the first stylus position, the second stylus position, and at least one other input. In this manner, the cursor positioning module 104 may be used to position a cursor.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

The writing device 108 may be any suitable writing device for writing on an input-sensitive display. For example, the writing device 108 may be a stylus, a finger, and so forth. In one embodiment, the servers 110 include computing devices, such as desktop computers, laptop computers, mainframe computers, cloud servers, virtual servers, and/or the like. In some embodiments, the servers 110 are configured as application servers, email servers, database servers, file servers, game servers, home servers, media servers, web servers, and/or the like. In certain embodiments, the servers 110 are configured to store data related to an identified item, and may be configured to be accessed by one or more information handling devices 102 through the network 106. In certain embodiments, the servers 110 may include at least a portion of the cursor positioning module 104 and may perform one or more operations of the cursor positioning module 104.

Figure 2:
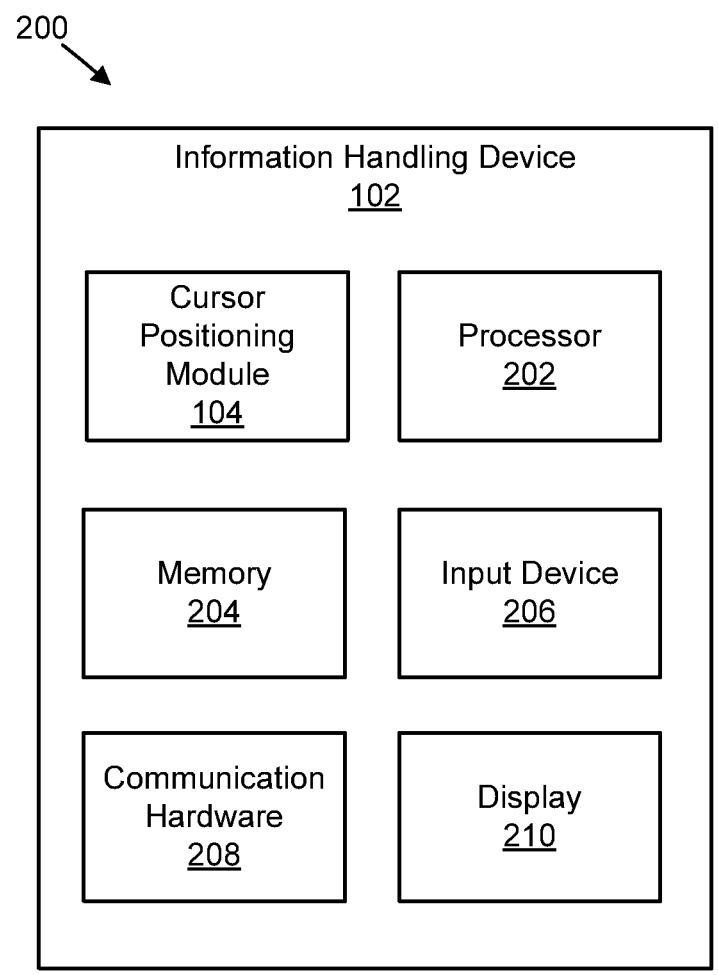
FIG. 2 is a schematic block diagram illustrating one embodiment of an apparatus for setting a cursor position.

FIG. 2 depicts one embodiment of an apparatus 200 which may be used for setting a cursor position. The apparatus 200 includes one embodiment of the information handling device 102. Furthermore, the information handling device 102 may include the cursor positioning module 104, a processor 202, a memory 204, an input device 206, communication hardware 208, and a display 210. In some embodiments, the input device 206 and the display 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the cursor positioning module 104, the input device 206, the communication hardware 208, and the display 210.

The memory 204, in one embodiment, is a computer readable storage medium. In some embodiments, the memory 204 includes volatile computer storage media. For example, the memory 204 may include a random access memory (RAM), including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to cursor positioning. In some embodiments, the memory 204 also stores program code and related data, such as an operating system or other controller algorithms operating on the information handling device 102. The information handling device 102 may use the cursor positioning module 104 for positioning a cursor using a stylus.

As may be appreciated, the cursor positioning module 104 may include computer hardware, computer software, or a combination of both computer hardware and computer software. For example, the cursor positioning module 104 may include circuitry, or a processor, configured to indications of stylus positions. As another example, the cursor positioning module 104 may include computer program code that determines a cursor position in response to indications of stylus positions and at least one other input.

The input device 206, in one embodiment, may include any known computer input device including a touch panel, a button, a keyboard, a stylus, or the like. For example, the input device 206 may include the writing device 108. In some embodiments, the input device 206 may be integrated with the display 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display 210, in one embodiment, may include any known electronically controllable display or display device. The display 210 may be configured to output visual, audible, and/or haptic signals. In some embodiments, the display 210 includes an electronic display capable of outputting visual data to a user. For example, the display 210 may include, but is not limited to, an LCD display, an LED display, an OLED display, a projector, or similar display device capable of outputting images, text, or the like to a user. As another, non-limiting, example, the display 210 may include a wearable display such as a smart watch, smart glasses, a heads-up display, or the like. Further, the display 210 may be a component of a smart phone, a personal digital assistant, a television, a table computer, a notebook (laptop) computer, a personal computer, a vehicle dashboard, or the like.

In certain embodiments, the display 210 includes one or more speakers for producing sound. For example, the display 210 may produce an audible alert or notification (e.g., a beep or chime) upon positioning a cursor at a position different than a current position of a stylus. In some embodiments, the display 210 includes one or more haptic devices for producing vibrations, motion, or other haptic feedback. For example, the display 210 may produce haptic feedback upon positioning a cursor at a position different than a current position of a stylus.

In some embodiments, all or portions of the display 210 may be integrated with the input device 206. For example, the input device 206 and display 210 may form a touchscreen or similar input-sensitive display. In other embodiments, the display 210 may be located near the input device 206. In certain embodiments, the display 210 may receive instructions and/or data for output from the processor 202 and/or the cursor positioning module 104.

As may be appreciated, an input-sensitive display may detect the writing device 108 while the writing device 108 contacts the input-sensitive display. Furthermore, the input-sensitive display may detect the writing device 108 while the writing device 108 is within a predetermined distance from the input-sensitive display. For example, the input-sensitive display may detect the writing device 108 while the writing device 108 is within 8 mm, 14 mm, 20 mm, or 30 mm of the input-sensitive display. As the writing device 108 gets farther from the input-sensitive display, it may be more difficult to position a cursor on the input-sensitive display that corresponds to a position of the writing device 108. In other words, as the writing device 108 gets closer to the input-sensitive display, the position of a cursor relative to the position of the writing device 108 may be more accurate.

Figure 3:
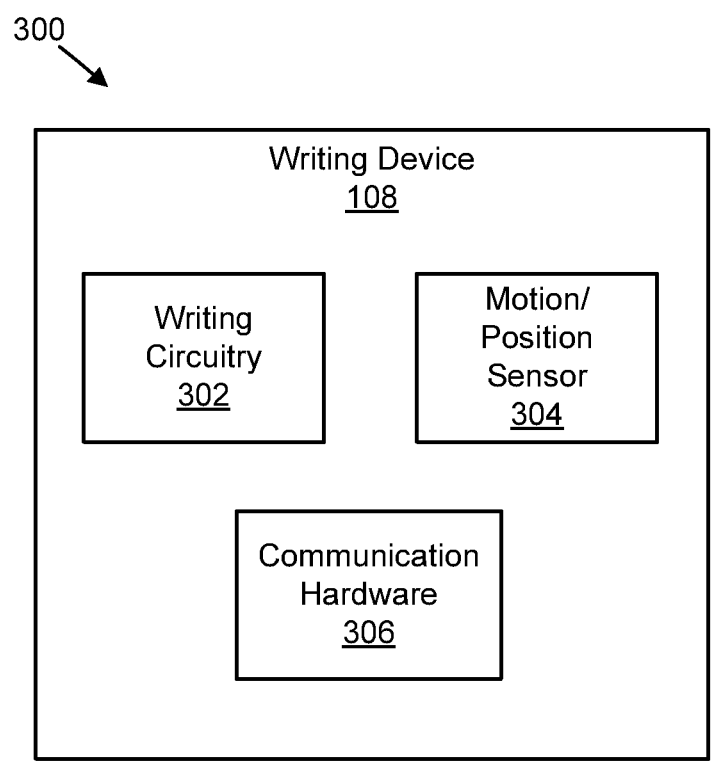
FIG. 3 is a schematic block diagram illustrating one embodiment of an apparatus that includes a writing device.

FIG. 3 depicts a schematic block diagram illustrating one embodiment of an apparatus 300 that includes one embodiment of the writing device 108. Furthermore, the writing device 108 includes writing circuitry 302, a motion and/or position sensor 304, and communication hardware 306. The writing device 108 (e.g., stylus) has a first end and a second end. Moreover, the writing device 108 includes the writing circuitry 302 in the first end. Having the writing circuitry 302 in the first end enables the writing device 108 to perform a write function and/or to perform other functions.

The motion and/or position sensor 304 may be an accelerometer, a gyroscope, an altimeter, a wireless transceiver, or any other suitable sensor used to provide data. The data from the motion and/or position sensor 304 may be used to determine a spatial position of the writing device 108, such as a position of the writing device 108 relative to a display. Data from the motion and/or position sensor 304 may aid in determining a cursor position on the display. For example, data from the motion and/or position sensor 304 may be used in together with the display sensing the writing device 108. The combined data from the motion and/or position sensor 304 and the display may enable a more accurate positioning of a cursor on the display.

Furthermore, the data from the motion and/or position sensor 304 may aid in determining a cursor position while the writing device 108 is used to perform a mouse click action. As may be appreciated, during use of the writing device 108 as a mouse (e.g., to resize a window) a user may hover the writing device 108 over the display to set a cursor position, then the user may touch the writing device 108 (or otherwise provide an input) to the display to perform the mouse click action. It should be noted that at certain times a user may inadvertently move the writing device 108 while transitioning from the hovering position to touching the display with the writing device 108 (or otherwise providing input to the display). This may cause undesired results. Accordingly, the data from the motion and/or position sensor 304 may be used to determine times in which the user hovers the writing device 108 over the display and/or moves the writing device 108 from a hovering position toward the display.

The communication hardware 306 may facilitate communication with other devices. For example, the communication hardware 306 may enable communication via Bluetooth®, Wi-Fi, physical connection, and so forth. In some embodiments, the communication hardware 306 may be used to determine the position of the writing device 108. In such embodiments, the motion and/or position sensor 304 may be omitted. Furthermore, in some embodiments, an input-sensitive display may determine a distance that the writing device 108 is positioned from the input-sensitive display. In such embodiments, the motion and/or position sensor 304 may likewise be omitted, in other words, the writing device 108 may not contain any non-standard hardware (e.g., no extra hardware is used, separate from a standard stylus and input-sensitive display).

Figure 4:
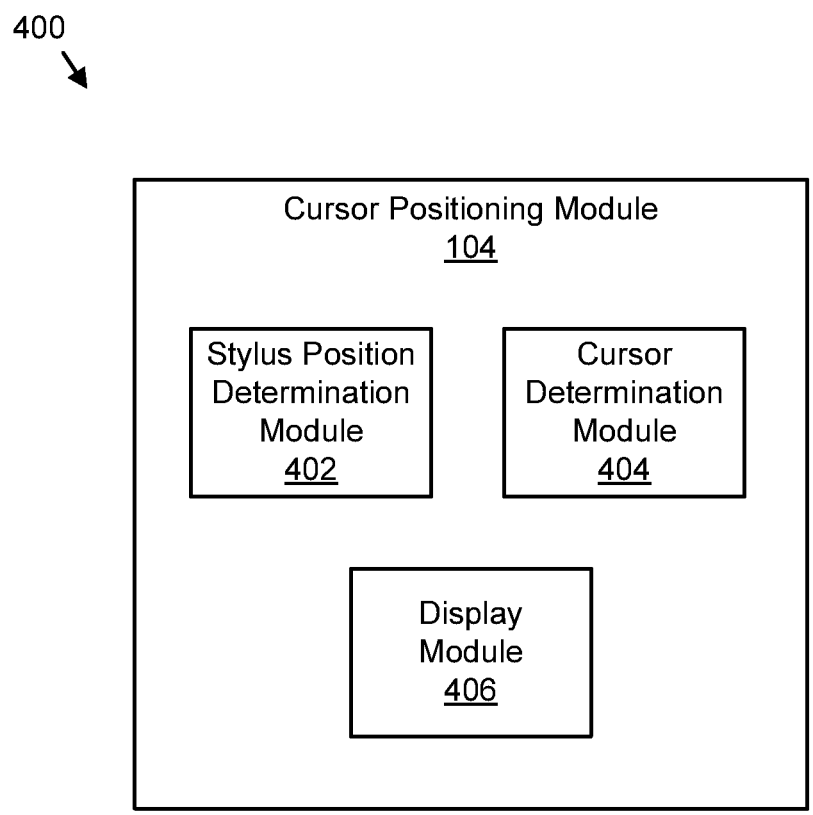
FIG. 4 is a schematic block diagram illustrating one embodiment of an apparatus that includes a cursor positioning module.

FIG. 4 is a schematic block diagram illustrating one embodiment of an apparatus 400 that includes one embodiment of the cursor positioning module 104. Furthermore, the cursor positioning module 104 includes a stylus position determination module 402, a cursor determination module 404, and a display module 406.

The stylus position determination module 402 may be used to determine the position of the writing device 108, such as the position of the writing device 108 relative to an input-sensitive display. In certain embodiments, the stylus position determination module 402 may receive data from the writing device 108 for use in determining the position of the writing device 108 relative to the input-sensitive display. For example, the stylus position determination module 402 may receive a signal from the motion and/or position sensor 304 of the writing device 108 and may determine the position of the writing device 108 relative to the input-sensitive display using the signal from the motion and/or position sensor 304. As another example, the stylus position determination module 402 may determine the position of the writing device 108 relative to the input-sensitive display based on a signal strength indicator detected by the input-sensitive display. The signal strength indicator may be produced by the interaction between the writing circuitry 302 of the writing device 108 and the input-sensitive display. The signal strength indicator may be used to determine a distance between the input-sensitive display and the writing device 108.

The cursor determination module 404 may be used to determine a position of a cursor to be displayed. For example, the cursor determination module 404 may be used to determine that the cursor should be held in a fixed position in response to the writing device 108 moving towards the input-sensitive display. As another example, the cursor determination module 404 may be used to determine that the cursor should be returned to a previous position held before a writing device 108 begins moving toward the input-sensitive display. In certain embodiments, the cursor determination module 404 may determine that the cursor should be returned to the previous position held before the writing device 108 began moving toward the input-sensitive display if there is a graphical feature located on the input-sensitive display near the previous position, if a cursor graphic on the input-sensitive display has changed from the time of the previous position, and/or writing device 108 positions indicate that the writing device 108 and the input-sensitive display are nearing each other (e.g., moving toward each other). As may be appreciated, a previous position may be any previous position, such as a position of the cursor 5 ms, 10 ms, or 100 ms previous to a current time. The display module 406 may be used to display the cursor.

In one embodiment, the cursor determination module 404 may receive data from the stylus position determination module 402 indicating that a user is hovering a stylus. The cursor determination module 404 may update a cursor position in real time using a latest reported stylus position directly (e.g., a hovering position). In some embodiments, the cursor determination module 404 may keep a list of prior reported stylus positions (e.g., 5, 10, 20, etc.), but may only use the latest reported stylus position to update the cursor position.

Furthermore, the cursor determination module 404 may receive data from the stylus position determination module 402 indicating that the user is touching the stylus toward the display. In such an embodiment, the cursor determination module 404 may update the cursor position to use the stylus position from the list of prior reported stylus positions (e.g., from 5, 10, or 20 samples ago, or fewer, or more). In one embodiment, the cursor determination module 404 may update the cursor position to use the stylus position from a weighted average of a prior number of samples (e.g., 5, 10, 15, 30, etc.).

In one embodiment, a click and/or touch event may be generated. In some embodiments, a touch event may include an updated and/or altered cursor position. As may be appreciated, by updating the cursor position using a prior reported stylus position, an offset from a most accurate position reported from hardware may be present. Accordingly, updating the cursor position using a prior reported stylus position may only be performed in certain modes, such as in response to a cursor hovering around buttons, object edges, graphics, and so forth.

Following the click and/or touch event, the cursor position may resume updating to a most recent and/or most accurate position. In some embodiments, the shift from using prior reported stylus positions to current stylus positions may be phased in, such as gradually moving from a weighted average stylus position to the current position, gradually using more recent stylus positions (e.g., using the sample from 9 samples ago, then 8 samples ago, until the current sample is reached), and so forth.

Figure 5:
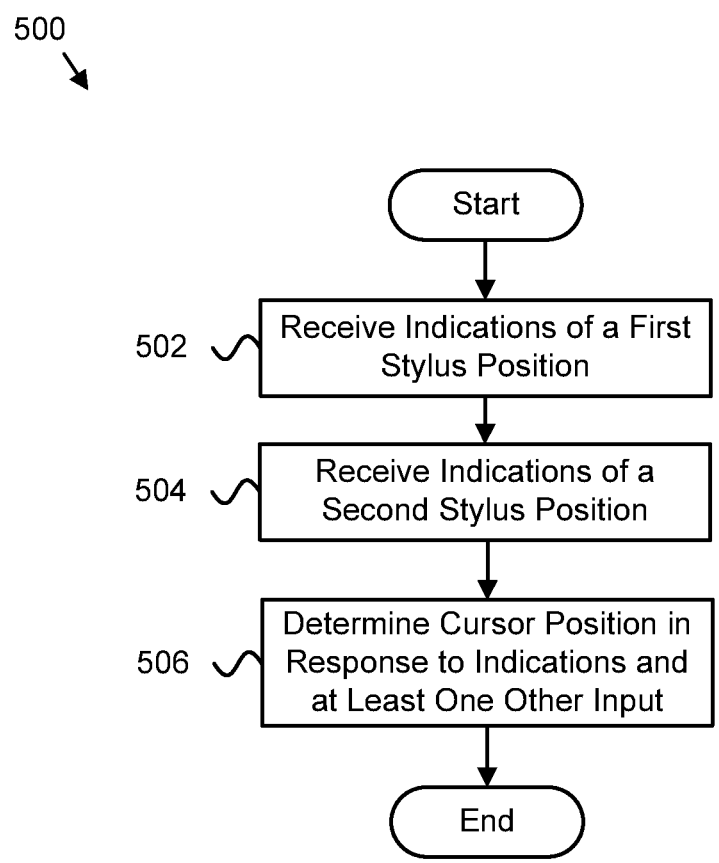
FIG. 5 is a schematic flow chart diagram illustrating one embodiment of a method for setting a cursor position.

FIG. 5 is a schematic flow chart diagram illustrating one embodiment of a method 500 for setting a cursor position. In some embodiments, the method 500 is performed by a tablet device, such as the information handling device 102. In other embodiments, the method 500 may be performed by a module, such as the cursor positioning module 104. In certain embodiments, the method 500 may be performed by a processor executing program code, for example, a microcontroller, a microprocessor, a central processing unit (CPU), a graphics processing unit (GPU), an auxiliary processing unit, a field programmable gate array (FPGA), or the like.

The method 500 may include receiving 502 indications of a first stylus position corresponding to a first time period. In some embodiments, the indications of the first stylus position may correspond to the stylus being in a hovering position. In such embodiments, a hovering position may mean that the stylus is held in a position above the input-sensitive display for a period of time. The period of time may be any suitable period of time, such as 50 ms, 100 ms, 200 ms, 500 ms, and so forth.

Moreover, the indications of the first stylus position may be a position relative to an input-sensitive display. In one example of relative positions, the stylus may be moving and the input-sensitive display may be moving in conjunction with the stylus (e.g., riding in a car, train, airplane, etc.). In such an example, the first stylus position may indicate that the stylus position is not moving relative to the input-sensitive display. In another example of relative positions, the stylus may be stationary and the input-sensitive display may be moving (e.g., user moving the input-sensitive display under the stylus). In such an example, the first stylus position may indicate that the stylus position is changing relative to the input-sensitive display.

The method 500 may also include receiving 504 indications of a second stylus position corresponding to a second time period after the first time period. In some embodiments, the indications of the second stylus position may indicate that the stylus and the input-sensitive display are nearing each other. For example, the second stylus position may indicate that the stylus is moving toward the input-sensitive display while the input-sensitive display remains substantially stationary and/or that the input-sensitive display is moving toward the stylus while the stylus remains substantially stationary. The indications of the second stylus position may be relative to the input-sensitive display.

The method 500 may determine 506 a cursor position in response to the indications of the first stylus position, the indications of the second stylus position, and at least one other input. The at least one other input may include a first input that sets the cursor position to a position corresponding to the indications of the first stylus position in response to a graphical feature being located on the input-sensitive display near the position. The graphical feature may be any suitable graphical feature, such as graphical features that a user may select. For example the graphical feature may be an icon, a button, a checkbox, a drop-down menu, a slider, a menu option, and so forth.

The at least one other input may also include a second input that sets the cursor position to the position corresponding to the indications of the first stylus position in response to a cursor graphic on the input-sensitive display changing during one or more of the first time period and the second time period. The cursor graphic is displayed on the input-sensitive display to represent a cursor. In certain embodiments, the cursor may be a moving pointer that a user controls using the stylus. As may be appreciated, the cursor graphic position corresponds to the position of the stylus. The cursor graphic may be any suitable graphic. For example, the cursor graphic may be a unidirectional arrow, a vertically oriented bidirectional arrow, a horizontally oriented bidirectional arrow, a diagonally oriented bidirectional arrow, a hand, an hourglass, a crosshair, a question mark, an I-beam, and so forth.

The at least one other input may include a third input that sets the cursor position to the position corresponding to the indications of the first stylus position in response to indications of the first and second stylus positions indicating that the stylus and the input-sensitive display are nearing each other. Nearing each other may include the input-sensitive display moving toward the stylus, the stylus moving toward the input-sensitive display, and/or the input-sensitive display and the stylus both moving toward each other. As may be appreciated, the at least one other input may include any combination of the first input, the second input, and the third input. Then the method 500 may end.

Figure 6:
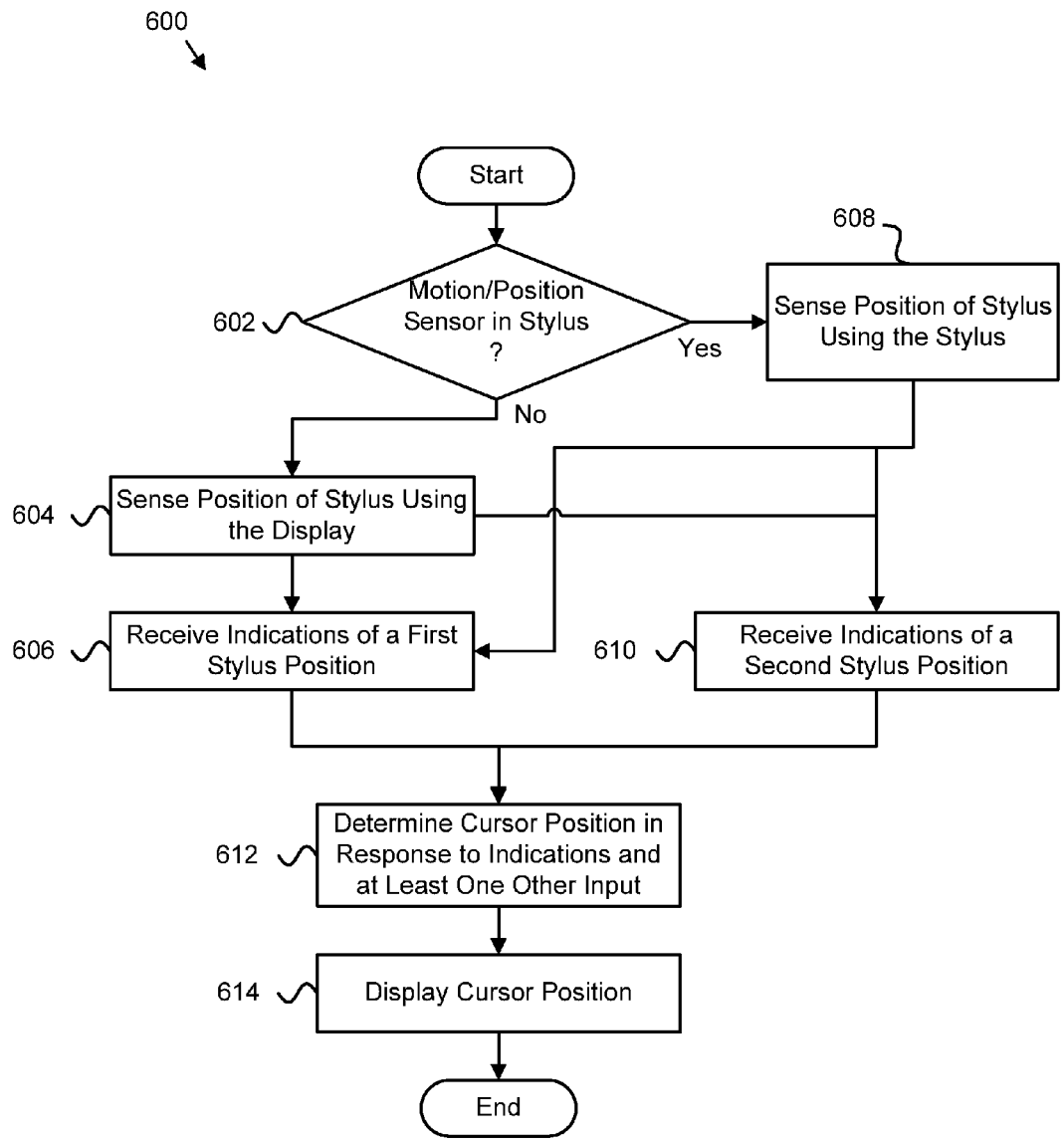
FIG. 6 is a schematic flow chart diagram illustrating another embodiment of a method for setting a cursor position.

FIG. 6 is a schematic flow chart diagram illustrating another embodiment of a method 600 for setting a cursor position. In some embodiments, the method 600 is performed by a tablet device, such as the information handling device 102. In other embodiments, the method 600 may be performed by a module, such as the cursor positioning module 104. In certain embodiments, the method 600 may be performed by a processor executing program code, for example, a microcontroller, a microprocessor, a central processing unit (CPU), a graphics processing unit (GPU), an auxiliary processing unit, a field programmable gate array (FPGA), or the like.

The method 600 may begin by determining 602 whether there is a motion and/or position sensor in a stylus. If the method 600 determines 602 that there is no motion and/or position sensor in the stylus, the method 600 senses 604 a position of the stylus using the input-sensitive display. For example, the method 600 may sense 604 the position of the stylus using the input-sensitive display by determining a signal strength created by the position of the stylus relative to the input-sensitive display. The signal strength may be used to determine a distance between the stylus and the input-sensitive display. The distance between the stylus and the input-sensitive display may be used to determine if the stylus is hovering, moving toward the input-sensitive display, and/or moving away from the input-sensitive display. The method 600 may receive 606 indications of a first stylus position corresponding to a first time period provided from the input-sensitive display.

If the method 600 determines 602 that there is a motion and/or position sensor in the stylus, such as the motion and/or position sensor 304, the method 600 senses 608 the position of the stylus using the motion and/or position sensor in the stylus. Accordingly, the motion and/or position sensor produces the indications of the first stylus position. The method 600 may receive 606 the indications of the first stylus position corresponding to the first time period provided from the stylus. As may be appreciated, the position of the stylus sensed 608 by the motion and/or position sensor may be used to determine the distance between the stylus and the input-sensitive display. The distance between the stylus and the input-sensitive display may be used to determine if the stylus is hovering, moving toward the input-sensitive display, and/or moving away from the input-sensitive display.

The method 600 may receive 610 indications of a second stylus position corresponding to a second time period after the first time period provided from either the input-sensitive display or the stylus. Moreover, the method 600 may determine 612 a cursor position in response to the indications of the first stylus position, the indications of the second stylus position, and at least one other input. The method 600 may display the cursor position. Then the method 600 may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a stylus;
    an input-sensitive display that receives stylus input;
    a processor;
    a memory that stores code executable by the processor, the code comprising:
        code that receives indications of a first stylus position transmitted from the stylus via circuitry in the stylus, wherein the first stylus position corresponds to a first time period;
        code that receives indications of a second stylus position transmitted from the stylus via the circuitry in the stylus, wherein the second stylus position corresponds to a second time period after the first time period, and wherein the first stylus position and the second stylus position are different;
        code that determines a cursor position as a function of the indications of the first stylus position, the indications of the second stylus position, and at least one other input; and
        code that sets the cursor position to a position near a graphical feature located on the input-sensitive display in response to the position corresponding to the indications of the first stylus position, and in response to receiving the indications of the second stylus position.

2. The apparatus of claim 1, wherein the stylus comprises a sensor selected from the group consisting of a motion sensor and a position sensor.

3. The apparatus of claim 1, wherein the stylus comprises one or more of an accelerometer, a gyroscope, an altimeter, and a wireless transceiver.

4. The apparatus of claim 1, wherein the code that determines the cursor position further comprises code that sets the cursor position to a position corresponding to the indications of the first stylus position in response to a cursor graphic on the input-sensitive display changing during one or more of the first time period and the second time period.

5. The apparatus of claim 1, wherein the code that determines the cursor position further comprises code that sets the cursor position to a position corresponding to the indications of the first stylus position in response to the indications of the first and second stylus position indicating that the stylus and the input-sensitive display are nearing each other.

6. The apparatus of claim 1, wherein the at least one other input comprises one or more of:
    an input that sets the cursor position to the position,
    an input that sets the cursor position to the position corresponding to the indications of the first stylus position in response to a cursor graphic on the input-sensitive display changing during one or more of the first time period and the second time period, and
    an input that sets the cursor position to the position corresponding to the indications of the first stylus position in response to indications of the first and second stylus positions indicating that the stylus and the input-sensitive display are nearing each other.

7. A method comprising:
    receiving, by use of a processor, indications of a first stylus position transmitted from a stylus via circuitry in the stylus, wherein the first stylus position corresponds to a first time period;
    receiving indications of a second stylus position transmitted from the stylus via the circuitry in the stylus, wherein the second stylus position corresponds to a second time period after the first time period, and wherein the first stylus position and the second stylus position are different;
    determining a cursor position as a function of the indications of the first stylus position, the indications of the second stylus position, and at least one other input; and
    setting the cursor position to a position near a graphical feature located on the input-sensitive display in response to the position corresponding to the indications of the first stylus position, and in response to receiving the indications of the second stylus position.

8. The method of claim 7, wherein receiving the indications of the first stylus position further comprises receiving indications that the stylus is in a hovering position.

9. The method of claim 7, further comprising sensing the indications of the first and second stylus positions using the stylus.

10. The method of claim 9, wherein sensing the indications of the first and second stylus positions further comprises sensing the indications of the first and second stylus positions using a sensor in the stylus.

11. The method of claim 7, further comprising sensing the first and second stylus positions using a display.

12. The method of claim 11, wherein sensing the first and second stylus positions using the display further comprises determining a signal strength created by a position of a stylus relative to the display.

13. The method of claim 7, wherein receiving indications of the first and second stylus positions further comprises receiving indications of the first and second stylus positions relative to a display position.

14. The method of claim 13, wherein receiving the indications of the first and second stylus positions relative to the display position further comprises receiving indications that a stylus remains substantially stationary during changes in the display position.

15. A program product comprising a non-transitory computer readable storage medium that stores code executable by a processor, the executable code comprising code to perform:
    receiving indications of a first stylus position transmitted from a stylus via circuitry in the stylus, wherein the first stylus position corresponds to a first time period;
    receiving indications of a second stylus position transmitted from the stylus via the circuitry in the stylus, wherein the second stylus position corresponds to a second time period after the first time period, and wherein the first stylus position and the second stylus position are different;
    determining a cursor position as a function of the indications of the first stylus position, the indications of the second stylus position, and at least one other input; and
    setting the cursor position to a position near a graphical feature located on the input-sensitive display in response to the position corresponding to the indications of the first stylus position, and in response to receiving the indications of the second stylus position.

16. The program product of claim 15, wherein the code that performs determining the cursor position further comprises code that performs setting the cursor position to a position corresponding to the indications of the first stylus position in response to a cursor graphic on a display changing during one or more of the first time period and the second time period.

17. The program product of claim 15, wherein the code that performs determining the cursor position further comprises code that performs setting the cursor position to a position corresponding to the indications of the first stylus position in response to indications of the first and second stylus positions indicating that the stylus and a display are nearing each other.

* * * * *